United States Patent [19]

Bertelsen

[11] Patent Number: 4,678,489

[45] Date of Patent: Jul. 7, 1987

[54] FILTERING SYSTEM FOR PAPER HANDLING MACHINES

[75] Inventor: John C. Bertelsen, 3060 Baker Rd., Dexter, Mich. 48130

[73] Assignee: John C. Bertelsen, Dexter, Mich.

[21] Appl. No.: 759,757

[22] Filed: Jul. 29, 1985

Related U.S. Application Data

[63] Continuation-in-part of Ser. No. 517,903, Jul. 28, 1983, abandoned, and a continuation-in-part of Ser. No. 708,649, Mar. 6, 1985, Pat. No. 4,563,943, each is a continuation-in-part of Ser. No. 443,122, Nov. 19, 1982, abandoned.

[51] Int. Cl.[4] .............................................. B01D 46/42

[52] U.S. Cl. ........................................ 55/418; 55/316; 55/412; 55/493; 55/503; 55/511; 55/DIG. 3; 55/DIG. 31; 98/115.1

[58] Field of Search ............. 55/316, 356, 357, 385 R, 55/418, 419, 467, 470, 472, 473, 480, 481, 482, 493, 495, 503, 511, DIG. 3, DIG. 31; 15/301, 314, 347, 327 D; 98/115.1

[56] References Cited

U.S. PATENT DOCUMENTS

| | | | |
|---|---|---|---|
| 693,838 | 2/1902 | Canedy | 98/115.1 |
| 913,966 | 3/1909 | Mohr | 55/DIG. 3 X |
| 1,820,026 | 8/1931 | Kuenhold | 55/418 X |
| 1,952,989 | 3/1934 | Joseph | 55/481 X |
| 2,064,587 | 12/1936 | Carlstedt | 55/DIG. 3 X |
| 2,347,334 | 4/1944 | Schmieg | 98/115.1 |
| 2,384,688 | 9/1945 | Litman | 98/115.1 |
| 2,415,471 | 2/1947 | Dorfan | 55/418 X |
| 2,430,448 | 11/1947 | Breckheimer | 15/314 X |
| 2,453,206 | 11/1948 | Donat | 55/357 |
| 2,644,188 | 7/1953 | Pacilio | 15/347 X |
| 2,796,143 | 6/1957 | Longenecker et al. | 55/316 |
| 2,881,854 | 4/1959 | Uehre, Jr. | 55/316 |
| 2,945,554 | 7/1960 | Berly | 55/316 X |
| 3,032,954 | 5/1962 | Racklyeft | 55/472 X |
| 3,208,205 | 9/1965 | Harms et al. | 55/472 |
| 3,279,883 | 10/1966 | Thompson et al. | 55/DIG. 29 X |
| 3,343,197 | 9/1967 | Carsey | 15/314 X |
| 3,434,416 | 3/1969 | Testone | 55/385 R X |
| 3,447,691 | 6/1969 | Andrews et al. | 55/511 X |
| 3,486,308 | 12/1969 | Burt | 55/472 X |
| 3,494,113 | 2/1970 | Kinney | 55/481 |
| 3,523,409 | 8/1970 | Paterson | 55/471 |
| 3,538,688 | 11/1970 | Stanley, Jr. et al. | 55/418 |
| 3,570,224 | 3/1971 | Clemens | 55/385 R X |
| 3,695,012 | 10/1972 | Rolland | 55/467 X |
| 3,738,088 | 6/1973 | Colosimo | 55/482 X |
| 3,778,985 | 12/1973 | Daigle | 55/511 X |
| 3,802,168 | 4/1974 | Deckas | 55/356 X |
| 3,925,043 | 12/1975 | Matrone et al. | 55/276 |
| 4,154,251 | 5/1979 | Doyel | 55/467 X |
| 4,163,650 | 8/1979 | Watson et al. | 55/356 X |
| 4,222,753 | 9/1980 | Mills | 55/467 X |
| 4,339,250 | 7/1982 | Thut | 55/467 X |
| 4,360,432 | 11/1982 | Kieronski | 55/418 X |

FOREIGN PATENT DOCUMENTS

| | | | |
|---|---|---|---|
| 157385 | 12/1979 | Japan | 55/470 |
| 600439 | 4/1948 | United Kingdom | 98/115.1 |
| 778321 | 7/1957 | United Kingdom | 98/115.1 |

*Primary Examiner*—Kathleen J. Prunner
*Attorney, Agent, or Firm*—Charles W. Chandler

[57] ABSTRACT

A filter apparatus is disclosed for removing contaminants directly from paper handling machines in data processing rooms. Such contaminants include paper dust and carbon black from high speed paper handling machines such as computer printers, paper cutters and the like. The apparatus comprises a wheeled housing having a top cover with an outlet grille. A squirrel cage fan is suspended from the cover beneath the grille. A filter pack is mounted beneath the fan. The bottom of the housing has an inlet opening connected to a duct which passes air from the machine being serviced, through the filter pack and out the grille.

A vacuum motor is mounted in the bottom of the housing and connected to a flexible hose for picking up material on the floor as well as spillage from inside the data processing machines. This material is passed through an in-line filter. The air from both the duct and the flexible hose is passed through the filter pack.

1 Claim, 9 Drawing Figures

FILTERING SYSTEM FOR PAPER HANDLING MACHINES

CROSS-REFERENCE TO RELATED APPLICATION

This application is a continuation-in-part of my co-pending application Ser. No. 517,903, filed July 28, 1983, now abandoned, and co-pending application Ser. No. 708,649, filed Mar. 6, 1985 which has issued as U.S. Pat. No. 4,563,943, July 14, 1986, both of which were continuation-in-part applications of application Ser. No. 443,122 filed Nov. 19, 1982 for Exhaust System for Paper Handling Machines, now abandoned.

BACKGROUND OF THE INVENTION

This invention is related to filtering devices for removing paper dust and computer chemicals such as developer, toner, carbon black and residues dispersed into the air in a data processing room by the operation of various paper handling machines, such as computer printers; and more particularly to a filter apparatus housing having a removable top cover with an outlet grille opening and a squirrel cage fan suspended from the cover for passing filtered air through the grille, and a vacuum sweeper attacment connected to the filter housing for collecting floor contaminants.

Data processing rooms can be environmentally harmful to both the personnel and the equipment because of the material discharged in the air by high speed paper handling machines. Certain machines in computer rooms are very dirty. For example, it is often very difficult to prevent the toner and developer from high speed laser printers from being discharged into the surrounding air when dry ink is inserted into the machine. The developer tends to collect on the computer room floor. Laser printers develop a residue during the printing and "fusing" stages. They also create paper dust as do impact printers. Such machines frequently have inadequate internal filtering systems, and usually no facilities for disposing of toner and developer spillage. The problem is aggravated because the machines are usually in a closed, air conditioned room having a controlled environment.

Certain computer printer developers include fine iron filings. Machines having disk and tape drives and located in the same room must be taken off-line and internally cleaned because the abrasive carbon black and paper dust cause head crash and disk interference. This requires expensive service calls from the manufacturers' field engineers.

Locating a high speed printer away from the other equipment in the computer room is not the solution since toner and developer particles have been found to settle on computer screens located as far as 48 feet from the printer.

Further, such airborne developer and toner particles are inhaled by the computing room staff. Some employees work around such printers seven days a week so that their normal body defense mechanisms may not be sufficient to prevent damage from such airborne particles. The air conditioning systems are believed to spread such particulates throughout the computing center.

Although little is known about the long range impact of such contaminants on personnel, some of the chemicals emitted by the printers are known to cause skin rashes, burning eyes and throat irritation.

SUMMARY OF THE INVENTION

The broad purpose of the present invention is to provide an improved filtering system for closed, air conditioned computing rooms, adapted to remove a variety of contaminants from the air such as iron filings, paper dust, carbon black, toner and developer particles and other harmful chemicals by providing a filter device having several filtering elements of different filtering media for removing the contaminants.

The preferred embodiment of the invention comprises a wheeled housing having a top opening. A removble cover having an outlet grille, is mounted on the top opening. A squirrel cage fan is suspended beneath the cover and is removable by the user with the cover without any tools for lubrication, inspection or cleaning. A multi-layer filter pack is mounted in the housing and includes four filtering stages for removing different types of particulates from the air.

A vacuum cleaner motor is mounted in the bottom of the housing, beneath the filter pack, and provides means for drawing air through a flexible hose for removing material either from the floor or from inside the machine being serviced. A conventional vacuum cleaner employing a bag is unsuitable for such purposes because the contaminants are so fine they pass through the bag material and filtering media.

The filter housing has a lower inlet opening. A duct is attached to the housing for directing the air from the machine being serviced to the filter housing. The duct is hingedly connected to the housing so that it can be pivoted away from the machine when it is being serviced by maintenance personnel. The duct has an internal baffle mounted in a novel manner to improve flow efficiency for air being redirected along a 90 degree turn.

The baffle is mounted so that the air enters through a relatively large inlet duct opening, passes through the duct and then exits into the filter housing through a smaller outlet. This permits a relatively small squirrel cage fan motor to move a relatively large amount of air through the filter housing.

The commercial embodiment of the invention is used by major universities, insurance companies, banks and other major computer users because for a long time it has been the only product commercially available for removing contaminants unique to a computer installation. The removable squirrel cage fan structure has several advantages over those filter devices in which a squirrel cage fan is attached to the housing so that to service the fan motor, the user has to remove the housing cover and then attempt to either service or unfasten the motor from a cramped location in the housing.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
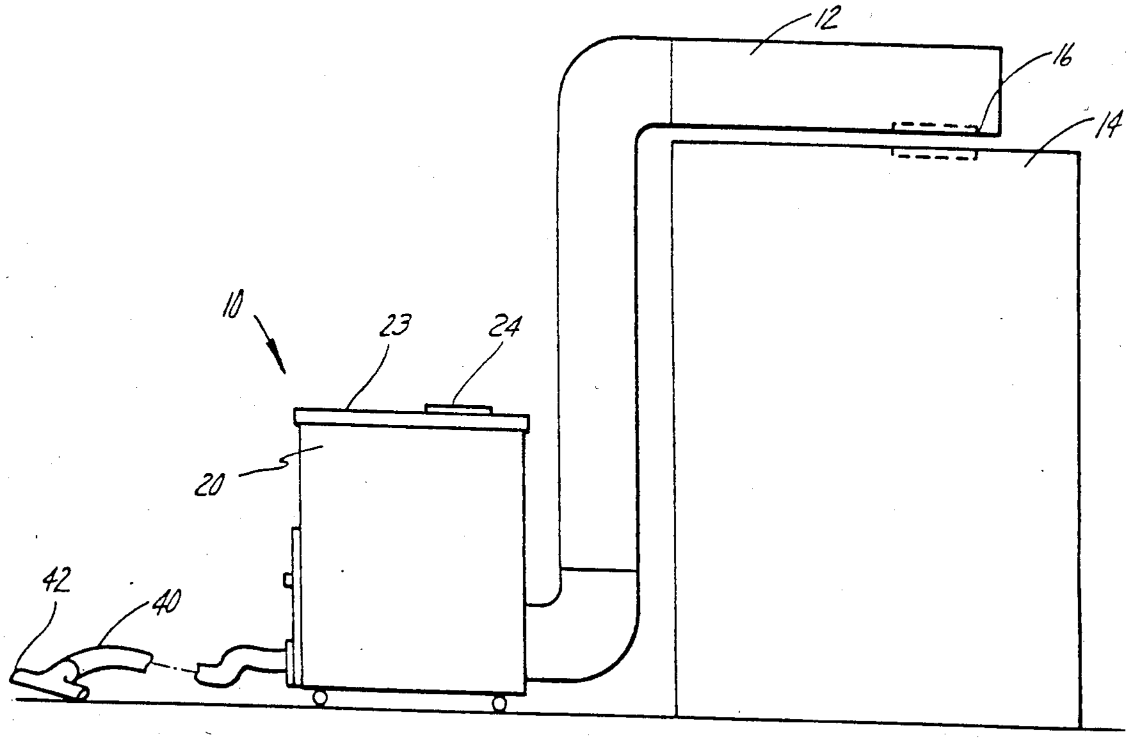
FIG. 1 is an elevational view of filtering apparatus illustrating the preferred embodiment of the invention mounted adjacent a laser printer.

Referring to the drawings, FIG. 1 illustrates a preferred mobile filtering apparatus generally indicated at 10 having a hood 12 and duct 13 for removing contaminants discharged from conventional high speed laser printer 14. The hood is custom designed to accommodate the outlet air opening of the particular computer device being serviced. Although printer 14 has an outlet opening for discharging contaminants into the air, some conventional printers do not have an exhaust vent but permit the contaminants to blow into the environment. In such a case, a ceiling-mounted hood (not shown) can be employed to capture the material as it leaves the printer. In this case, the hood has inlet opening 16 for receiving the contaminants and directing them through duct outlet opening 17 toward bottom opening 18 of filter housing 20.

Figure 2:
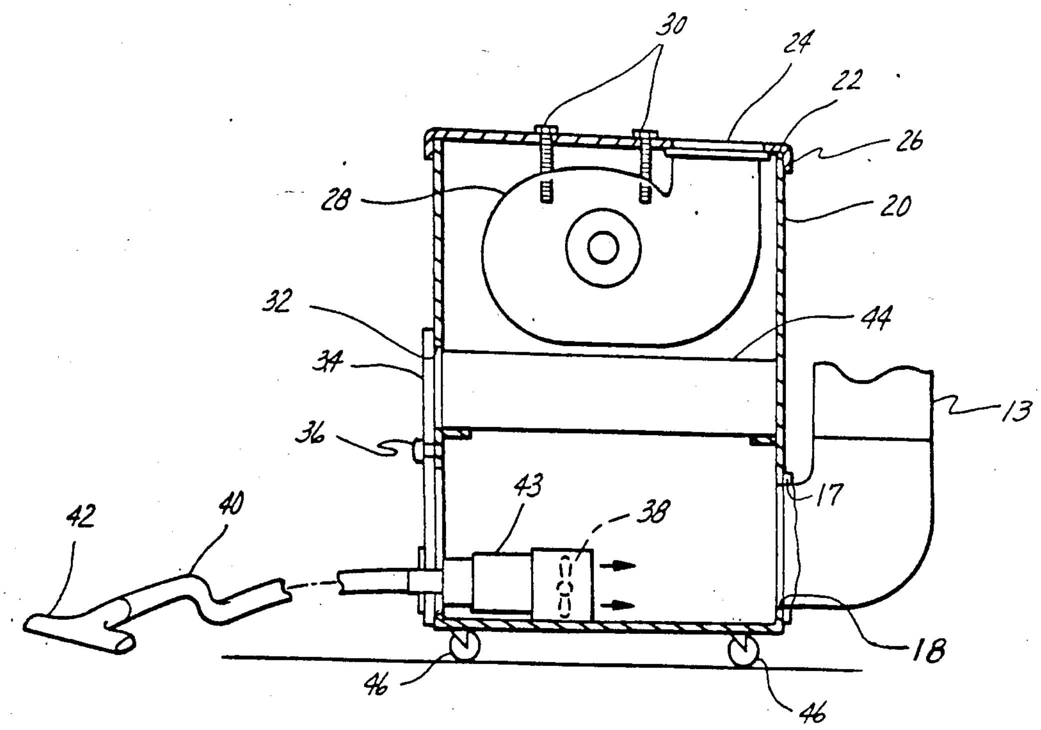
FIG. 2 is a sectional view through the filter housing of FIG. 1.

Referring to FIG. 2, filter housing 20 has a top opening 22. Cover 23, having grille 24, is mounted on the top opening, and has a downwardy depending lip 26 adjacent the top edge of the housing.

Figure 4A:
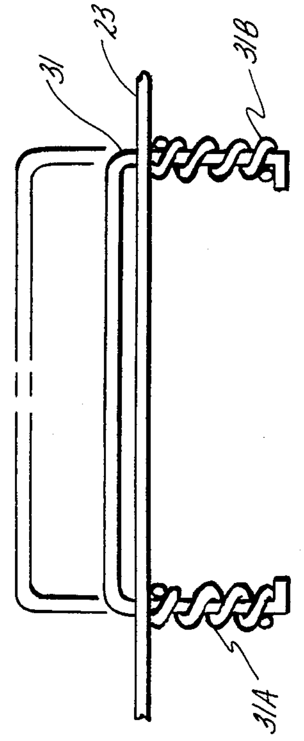
FIG. 4A is a fragmentary view showing one of the handles for lifting the top cover.

An electrically-energized squirrel cage fan 28 is suspended by four bolt means 30 beneath the grille so that the cover and the fan can be lifted together by means of a pair of handle means 31 from the filter housing for lubrication and service. FIG. 4A illustrates a typical handle mounted such that it can be raised to the lifting position illustrated in phantom from a lower position. Spring means 31A and 31b bias the handle toward the cover.

Housing 20 also has front opening 32. Cover plate 34 is attached by fastener means 36 over opening 32.

Motor-driven fan 38 is mounted in the bottom of the housing. Flexible hose 40 has one end connected to the housing adjacent the fan motor. Nozzle 42 is carried at the opposite end of the hose in such a manner that the motor-driven fan can draw air through the hose and in-line filter 43 for removing contaminants carried with the air from the floor. The contaminants are then directed upwardly toward the grille opening through filter pack 44.

The housing is mounted on wheel means 46 so that the user can move the filter housing toward a selected location.

Figure 5:
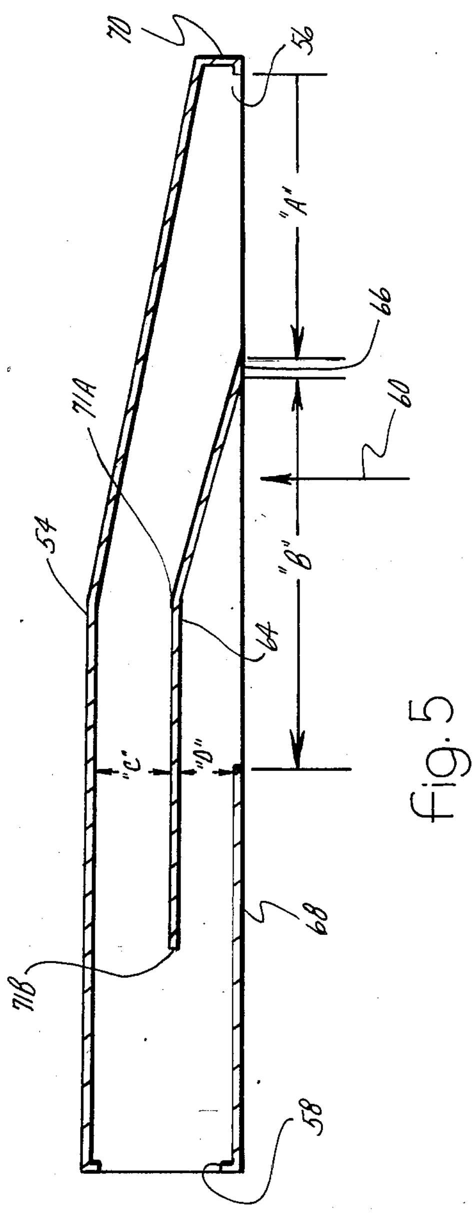
FIG. 5 is a sectional view of the wing.
Figure 3:
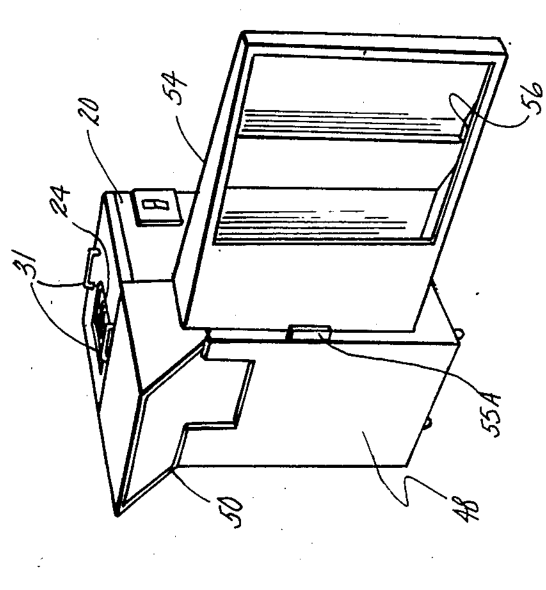
FIG. 3 is a perspective view of the filter housing with a hinged hollow wing.
Figure 4:
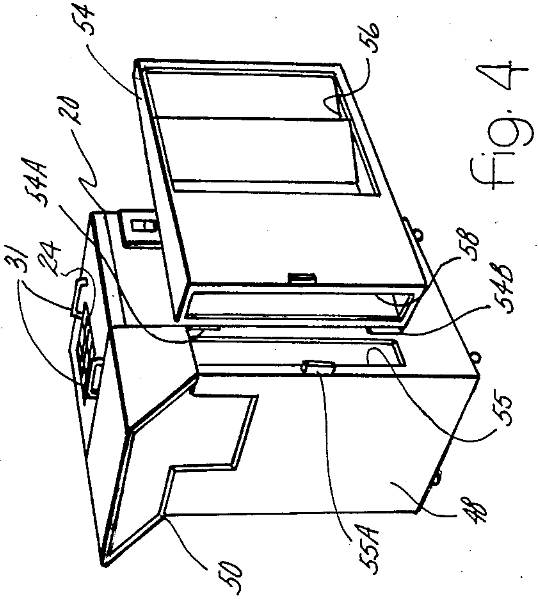
FIG. 4 is a view similar to FIG. 3 but showing the wing pivoted toward the side of the filter housing.

FIGS. 3, 4 and 5 illustrate filter housing 20 employed for removing contaminants from a printer having a pair of exhaust openings. The housing has air chamber case 48 which encloses bottom inlet opening 18, to direct the air received through hood opening 50 toward the bottom inlet opening.

Hollow wing 54, which functons as a duct, is mounted by hinges 54A and 54B to the side wall of case 48. The hinges mount the wing adjacent an elongated opening 55 so that the wing can be pivoted from a filtering position, illustrated in FIG. 3, toward a side position, illustrated in FIG. 4. This is particulary useful when the wing must be moved out of its normal filtering position between the filter housing and the machine being serviced and obviates the necessity for wheeling the entire flter housing toward another location. Latch means 55A provide means for locking the wing in its filtering position.

Referring to FIG. 5, wing 54 is elongated and has an inlet opening 56 and a smaller outlet opening 58. The inlet opening is adapted to receive air from a printer in a direction generally indicated at 60, that is at right angles to the longitudinal axis of the wing. The air is redirected by baffle 64 toward the outlet opening. The inlet edge 66 of the baffle is mounted adjacent inlet opening 56 and divides it into two sections. The area of the inlet opening between the baffle and wall 68 is greater than that of the area between the baffle and wall 70. For example, for a wing 36 inches long, dimension "A" of the inlet section on the outside of the turn of the incoming air is $9\frac{7}{8}$ inches and dimension "B" which is the width of the inside of the turn is $13\frac{1}{4}$ inches.

The downstream portion of the baffle divides the transverse cross-section of the wing into two unequal sections from elbow 71A to baffle edge 71B. Dimension C is $3\frac{1}{8}$ inches and dimension D is 2 inches in a direction at right angles to the longitudinal axis of the wing measured from the edge of wall 68 at the inlet opening. Baffle edge 71B is $7\frac{1}{8}$ inches upstream of the outlet opening. The baffle location balances the flow rate on the two sides of the baffle resulting from the uneven flow caused by the right angle turn as the air enters the wing, and the fact that the air is flowing from a large inlet opening toward a smaller outlet opening as it passes through the wing. The air passing through the smaller outside portion of the inlet opening has to travel a greater distance than the air passing through the larger portion of the inlet opening. This is compensated by making the transverse cross section of the wing on the side of the baffle receiving the air on the outside of the turn greater than the side of the baffle receiving air on the inside of the turn.

Figure 6:
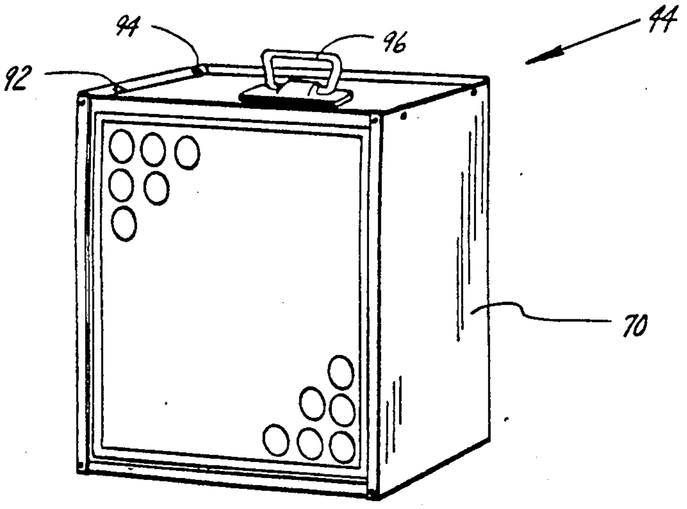
FIG. 6 illustrates the preferred filter pack removed from the filter housing.
Figure 7:
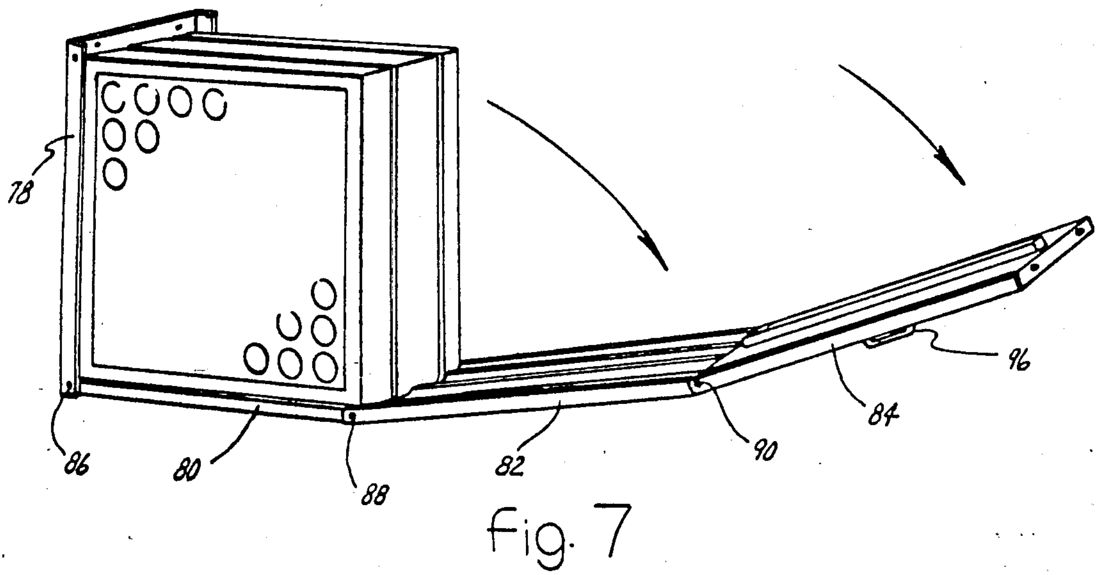
FIG. 7 shows the manner in which the filter pack frame is unfolded.
Figure 8:
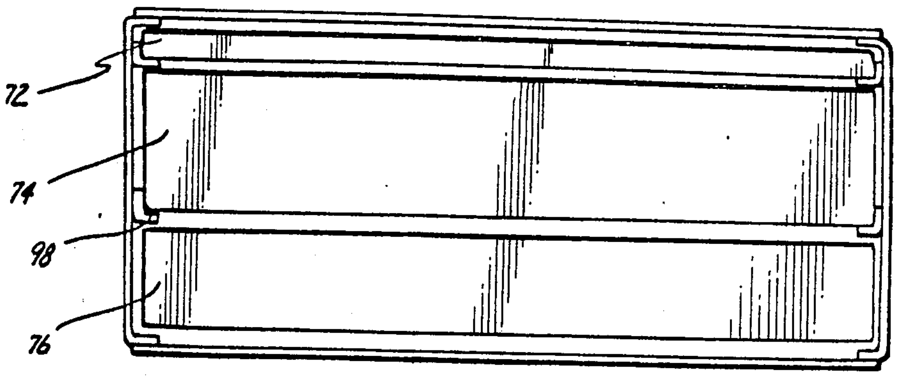
FIG. 8 is a plan view of the filter pack with the top frame member removed.

FIGS. 6, 7, and 8 illustrate preferred filter pack 44. Filter pack 44 includes frame means 70 supporting filter units 72, 74 and 76 which provide a four-stage filtering arrangement. The filter pack frame includes four frame members respectively designated as 78, 80, 82 and 84. Hinge means 86 connects the lower end of frame member 78 to the left end of frame member 80. Hinge means 88 connect the opposite end of frame member 80 to one end of frame member 82. Similar hinge means 90 connect the opposite end of frame member 82 to top member 84. Thus the frame members can be opened to receive the filter units and then closed, as illustrated in FIG. 6, to a position in which wedge fastener means 92 and 94 connect top member 84 to side member 78 to form a four-sided unitary structure.

Handle means 96 are mounted on the top frame member so that the user can easily remove and carry the filter pack.

Referring to FIG. 8, frame members 78, 80 and 82 each have rib means 98 for separating the individual filter units. Preferably, filter unit 72 is one inch thick of a non-woven cotton fiber. Filter unit 74 is a four inch thick filter of an ultra-fine fiberglass. Filter unit 76 is a double stage unit having particles of activated charcoal for removing odors as well as a synthetic product known as "PURAFIL" to detoxify substances such as formaldehyde.

Thus it is to be understood that I have described an improved filter housing for computer rooms in which the filter apparatus has means for removing contaminants passed from a paper handling machine, such as a computer printer, and a vacuum cleaner attachment for removing contaminants from the floor as well as inside machines.

Having described my invention, I claim:

1. Filter means for removing paper dust, carbon black and the like from air being discharged in a first direction from a high-speed paper handling machine, comprising:

a housing having a top opening and a lower inlet opening;

a cover having a grille for passing filtered air from the housing, the cover being removably mounted on said top opening;

an electrically energized squirrel cage fan;

elongated fastener means having their upper ends connected to the cover and their lower ends connected to the fan such that the fan is suspended solely from the cover when the cover is mounted on said top opening, the fastener means and the fan being removable together with the cover from the housing, the fan being operative to move air from the paper handling machine toward the grille;

filter pack means for removing material from air passing therethrough, said filter means being mounted in the housing between the grille and the lower inlet opening and including:

filtering media in a four-sided unit;

frame means including first, second, third and fourth elongated frame members, each of said frame members having a length generally corresponding to the length of a side of said unit;

first hinge means connecting the first frame member to the second frame member;

second hinge means connecting the second frame member to the third frame member;

third hinge means connecting the third frame member to the fourth frame member;

means for releasably connecting the fourth frame member to the first frame member to form a frame assembly in which each frame member is movable with respect to the other three of the frame members between an open position for receiving the filtering media, and a closed position in which the frame members are each disposed side-by-side with a corresponding side of the four-sided unit to engage the four sides of the filtering media unit such that the filtering media is disposed to filter air being passed from the lower inlet opening toward the grille by the fan;

an elongated hollow duct hingedly mounted on the housing for guiding air from the paper handling machine to the filter housing, the duct having an inlet opening at one end thereof, and an outlet opening at the opposite end thereof adjacent the lower inlet opening of the housing for passing air from the duct to the housing, the duct inlet opening having a first cross-section, and the duct outlet opening having a lesser cross-sectional area than the cross-section of the inlet opening, the duct inlet opening being disposed for receiving air along a path generally at right angles to the longitudinal axis of the duct, the duct having a midsection between the duct inlet opening and the duct outlet opening for receiving air from the paper handling means and passing it through the duct midsection toward the duct outlet opening;

an elongated baffle member mounted within the duct parallel to the longitudinal axis of the duct;

the baffle member having an inlet edge disposed to divide the duct inlet opening into a first section and a second section, the area of the cross-section of the first section being greater than the area of the cross-section of the second section, and the first section being disposed between the second section and the duct outlet opening;

the baffle member having a downstream section between the duct inlet opening and the duct outlet opening disposed in a plane transverse to said first air direction;

whereby as the air enters the duct inlet opening, it changes direction from said first direction toward said second direction as it moves downstream from the inlet opening toward the duct outlet opening.

* * * * *